United States Patent Office 3,623,919
Patented Nov. 30, 1971

FIG. 9.
FIG. 10.
FIG. 11.
FIG. 12.
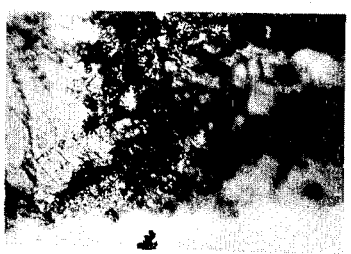
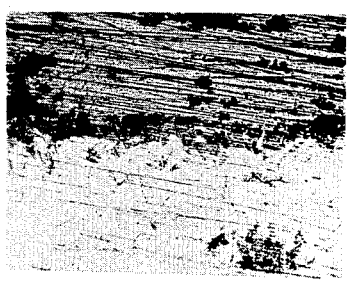
FIG. 13.
FIG. 14.
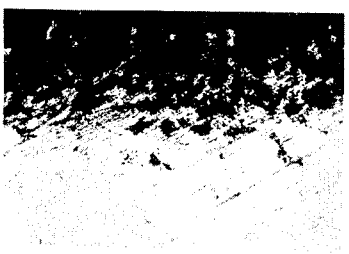
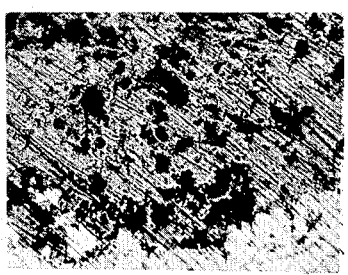
FIG. 15.
FIG. 16.

3,623,919
METHOD FOR TREATING THE SURFACE OF A FERROUS MATERIAL
Hisami Suzuki, Aichi-ken, Japan, assignor to Kabushiki Kaisha Toyota Chuo Kenkyusho, Aichi-ken, Japan
Filed May 6, 1969, Ser. No. 822,215
Claims priority, application Japan, May 16, 1968, 43/33,319
Int. Cl. C23f 7/00
U.S. Cl. 148—6.14 R    2 Claims

ABSTRACT OF THE DISCLOSURE

A method for treating the surface of a ferrous material comprising polish-deoiling said surface, and immersing the material at room temperature in an iodine-bearing atmosphere which may be gaseous, or liquid to form a treated surface layer having excellent resistance to seizure and which inhibits peeling. The resistance to seizure of the treated surface may be further improved by low temperature heat treatment which disperses the iodine in the surface layer and causes greater penetration.

SPECIFICATION

Figure 1:
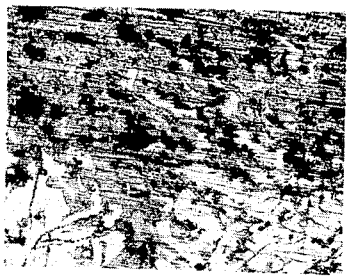
Figure 2:
Figure 3:
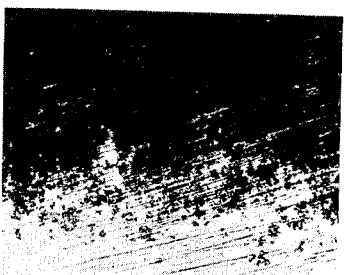
Figure 4:
Figure 5:
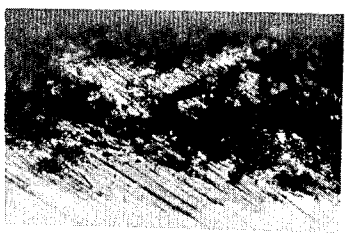

The present invention relates generally to treatment of ferrous materials in such manner as to obtain a surface layer having excellent resistance to seizure, or galling, and more particularly to a method for such purpose which involves iodizing the ferrous material.

Heretofore the most prevalent conventional method for imparting resistance to seizure to a ferrous material involved a process termed "sulphurizing" in which the specimens are immersed in a molten bath of sulphur salts at high temperature to form a sulfide on the surface of the material. During the immersion period the composition of the bath becomes unstable, and it is very difficult to uniformly and always obtain a treated surface layer having the required resistance to seizure. The treating temperature of the bath ranges from 550 to 600° centigrade, and when the specimen is formed of steel, and particularly high grade tool steel, the steel will change in microscopic structure because of the high temperature; its hardness will be quickly lowered, resulting in qualities which are detrimental to use of the treated steel where strength and hardness are required. In addition a rust preventive treatment is required.

The present invention contemplates a new and improved surface treatment for ferrous materials which employs an iodine treatment alone and entirely omits any and all conventional sulphurizing steps. Experiments carried out with the method of the present invention confirmed the fact that very satisfactory resistance to seizure can be obtained by a simplified process, said results being comparable to or better than those achieved in the conventional sulphurizing treatment, briefly outlined above, and the new process achieving a resistance to seizure ranging from 2 to 150 times greater than that of the same ferrous material whose surface is not treated in any way. Particularly, the present invention yields a more excellent surface than other methods when the surface is used without a lubricant. Such a material finds wide acceptance wherever anti-friction surfaces are necessary.

Accordingly, it is a primary object of the present invention to provide a new method for treating the surface of a ferrous material which eliminates the disadvantages and detriments of the conventional sulphurizing treatment outlined above.

Another object of the invention is to provide a method for treating the surface of a ferrous material for producing a resistance to seizure without employing sulphurizing steps and which will achieve a resistance to seizure at least equal to or better than that obtained by the conventional sulphurizing treatment, and which avoids the need for rust prevention.

A further object of the invention is to provide an improved method for treating the surface of a ferrous material to achieve excellent resistance to seizure and which involves process steps carried out at room temperature rather than at high temperature, thereby avoiling the possibility of deleterious changes in the structure of the treated specimen and any reduction in hardness.

The novel features that are considered characteristic of the invention are set forth with particularly in the appended claims. The invention itself, however, both as to its organization and its method of operation, together with additional objects and advantages thereof, will best be understood from the following description of specific embodiments, when read in connection with the accompanying drawings, wherein like reference characters indicate like parts throughout the several figures, and in which:

FIG. 1 through FIG. 21 are microscopic photographs showing a section through the surface layer obtained in various specimens by practicing the method of the present invention. In each of the figures the sample was sliced at an angle of 10° with the surface of the specimen and polished without the use of an eroding liquid. The resulting cut surfaces were photographed under a microscope to reveal the nature of the surface layer. FIGS. 1–6, 9, 10, 13–15 and 19–21 were magnified 100 times. FIGS. 7, 8, 11, 12, and 16–18 were magnified 400 times. The exact iodizing treatment afforded each specimen of the respective figures is set forth in Tables 1–4 hereinafter.

Figure 22:
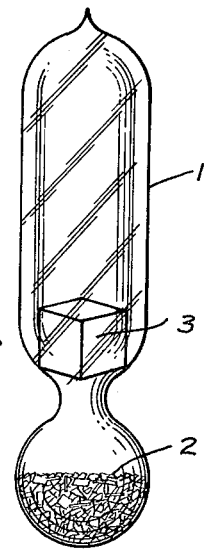

FIG. 22 is a diagrammatic elevational view showing one embodiment of an apparatus usable for treating ferrous materials in a gaseous iodine environment according to the present invention.

The method of the present invention may be generally described as follows: The surface of a specimen of ferrous material such as steel, cast iron, or alloy steel, is first polished with emery paper; then it is washed and degreased to remove the fat and oil. The specimen is then immersed in an iodine solution, or subjected to an environment of iodine gas.

For the solution in which the specimen is immersed, solvents such as alcohol, benzene, carbon disulphile, acetone, and mixtures thereof may be used. Other solvents may be substituted provided that they can retain iodine in solution. Iodine or an iodide such as ammonium iodide ($NH_4I$), sodium iodide ($NaI$), aluminum iodide ($AlI_3$), or the like, is added to the solvent to prepare the solution. Alternatively, an aqueous iodide solution may be prepared by adding a soluble iodide such as ammonium iodide, sodium iodide, or potassium iodide to water.

In preparing the solution, it is preferable that the concentration of iodine in the solution be very high, and, therefore, when the solution is prepared by saturating the solvent with an iodide, iodine is added to further saturate the solvent, as for example, a 0.7 cc. water sample when first saturated with 1 gr. of potassium iodide (KI) can be further saturted with 1.53 grs. of iodine ($I_2$). This will remarkably improve the resistance to seizure of the surface of the treated specimen. The thickness of the surface layer formed by the immersion treatment is proportional to the time of specimen immersion, but generally speaking, a satisfactory layer can be obtained when the immersion is carried out for about 10 hours. As a matter-of-fact, when immersion for less than 10 hours is practiced, it may still yield satisfactory resistance to seizure since an iodized layer is formed, even though thinner than desirable.

Instead of immersion in an iodine solution, the speciment whose surface has been deoiled can be placed or held in an iodine vapor to produce the same, or a similar iodized surface layer on the ferrous material.

The surface layer formed by the outlined method of the present invention was checked by X-ray without detection of iron monoiodide (FeI), ferric iodide (FeI$_3$), or ferrous iodide (FeI$_2$ or FeI$_2\cdot$4H$_2$O), but when examined with an electron probe microanalyzer, iodine was detected, and from this it is considered that a composite compound of light gray color, believed to be a composite iron-iodine compound, is produced adjacent the surface as activated iodine enters the structure of the specimen. This surface layer is clearly shown in the top portions of each of the microscopic photographs of FIGS. 1–21. The iodized surface layer was found to be strongly bonded to the specimen, it does not easily peel off, and cannot be eliminated even by a subsequent high temperature treatment such as oil quenching. The iodized layer works as a kind of solid lubricant, and it yields a high resistance to seizure, or galling of the surface of the specimen.

The iodizing treatment, as thus far explained, yields a product having sufficient resistance to seizure for many practical applications, but when a dispersion treatment is added to the immersion step, improved resistance to seizure can be obtained. The dispersion treatment briefly includes subjecting the iodized specimens to heat in the range of about 150° C.–450° C. for a period of about 2–3 hours and allowing the specimens to furnace cool (FC). Specific examples of the iodizing treatment are given below.

EXAMPLE 1

Specimen plates each of a size 10 x 10 x 15 mm. were cut from cast iron according to the Japanese Industrial Standard (JIS FC–25), high speed steel (JIS SKH–3), spherical graphite cast iron (JIS FCD–70) and steel (JIS S–45). After polishing with emery paper to clean off the oils on the surfaces and to deoil them, the specimens were immersed for a period of 24 hours in a saturated iodine-ethyl alcohol solution at room temperature. Upon removal from the solution, some of the specimens were subjected to a dispersion treatment comprising heating at 200° C. for a period of 3 hours and furnace cooled. Each treated specimen was then cut along a plane at 10° to a surface, the cut surface polished without erosion as previously explained, and microphotographed with results as shown in FIGS. 1–5 as listed in Table I below.

TABLE I

| Figure Number | Solution | Specimen material | Immersion time (hrs.) | Dispersion treatment |
|---|---|---|---|---|
| 1 | C$_2$H$_5$OH + I$_2$ | FC-25 | 24 | 200°×3 hr. (FC). |
| 2 | Same as above | FC-25 | 24 | Not treated. |
| 3 | do | SKH-3 | 24 | 200°×3 hr. (FC). |
| 4 | do | FCD-70 | 24 | Same as above. |
| 5 | do | S-45 | 24 | Do. |

As is apparent from Table 1, and the microphotographs designated therein, a layer is formed within the surface of the specimen by penetration of the iodine from the solution into the ferrous material. The formed layer is integrally bonded to the ferrous material by this penetration and there is no danger that it will peel off. When the iodized layer was examined with an electron probe analyzer, iodine was detected in the layer and believed to be an iron-iodine composite compound.

EXAMPLE 2

Cast iron specimens of the same size as in Example 1 were immersed in a solution formed by saturating an iodide (such as ammonium iodide or sodium iodide) into ethyl alcohol at room temperature for 24 hours and, in some instances, followed by a dispersion treatment as in Example 1. Microphotographs of the specimens were then taken in the same manner as in Example 1, and are shown in FIGS. 6–8 listed in Table 2 below:

TABLE II

| Figure Number | Solution | Specimen material | Immersion time (hrs.) | Dispersion treatment |
|---|---|---|---|---|
| 6 | C$_2$H$_5$OH + NH$_4$I | FC-25 | 24 | 200°×3 hr. (FC). |
| 7 | Same as above | FC-25 | 24 | Not treated. |
| 8 | C$_2$H$_5$OH + NaI | FC-25 | 24 | 200°×3 hr. (FC). |

Figure 6:
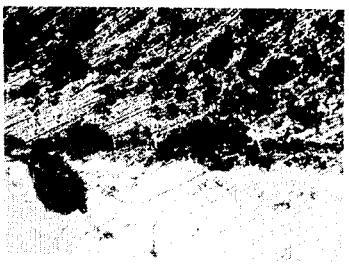
Figure 7:
Figure 8:
Figure 17:
Figure 18:
Figure 19:
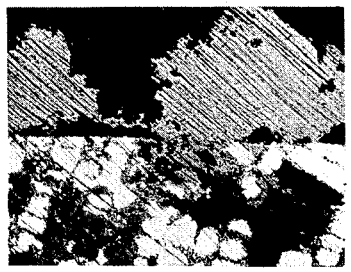
Figure 20:

The microphotographs, FIGS. 6–8 as listed in Table 2 above, are indicative that an excellent iodized layer also is obtained by using an iodide dissolved in a solvent for the immersion solution.

EXAMPLE 3

Specimens of ferrous materials including cast iron, Meehanite cast iron, and bearing steel (JIS SUJ–2) of the same size as in Embodiment 1 were prepared and immersed for various periods of time in a solution prepared by saturating iodine into a solvent other than ethyl alcohol (such as carbon disulphide, benzene, or acetone) in the manner set forth under Example 1. Certain of the specimens were heat treated for dispersion after removal from the solution.

The microphotographs taken after the above treatment are shown in FIGS. 9–15, and listed in Table 3 below:

TABLE III

| Figure Number | Solution | Specimen material | Immersion time (hrs.) | Dispersion treatment |
|---|---|---|---|---|
| 9 | CS$_2$ + I$_2$ | FC-25 | 24 | 200°×3 hr. (FC). |
| 10 | Same as above | FC-25 | 24 | Not treated. |
| 11 | do | Meehanite cast iron | 48 | 200°×3 hr. (FC). |
| 12 | do | SUJ-2 | 48 | Same as above. |
| 13 | C$_6$H$_6$ + I$_2$ | FC-25 | 15.5 | Do. |
| 14 | Same as above | Meehanite cast iron | 48 | Do. |
| 15 | CH$_3$COCH$_3$ + I$_2$ | FC-25 | 15.5 | Do. |

The microphotographs, FIGS. 9-15 listed in Table 3, indicate that an excellent iodized layer is formed within the surface of a specimen, whether or not subject to a dispersion treatment after immersion, when the specimen is immersed in a solution prepared by dissolving iodine into a solvent other than ethyl alcohol.

EXAMPLE 4

Cast iron specimens were prepared as in Example 1, and immersed for varying periods of time as indicated in Table 4 below, in an aqueous iodide solution at room temperature, such as ammonium iodide, sodium iodide, or ferric iodide, or in such solution further saturated by the addition of iodine into the water. Certain of the specimens were treated for dispersion in the same manner as in Embodiment 1 and microphotographs were prepared of the resulting surfaces as shown in FIGS. 16-20 listed in Table 4 below.

TABLE IV

| Figure Number | Solution | Specimen material | Immersion time (hrs.) | Dispersion treatment |
|---|---|---|---|---|
| 16 | $H_2O + NH_4I$ | FC-25 | 24 | 200°×3 hr. (FC). |
| 17 | $H_2O + NH_4I$ | FC-25 | 24 | Not treated. |
| 18 | $H_2O + NAI$ | FC-25 | 48 | 200°×3 hr. (FC). |
| 19 | $H_2O + FeI_3$ | FC-25 | 24 | Same as above. |
| 20 | $(H_2O + KI) + I_2$ | FC-25 | 24 | Do. |

Table IV is indicative that when a specimen is immersed in a saturated iodide aqueous solution or when the solution is further saturated by adding iodine thereto, and the specimen is removed from the solution after a suitable period of time, whether or not the specimen is subjected to a dispersion treatment, a sufficiently good iodized surface layer is obtained.

EXAMPLE 5

Figure 21:

Iodine crystals 2 were inserted into the lower portion of the glass vessel 1, and a cast iron specimen in block form, but otherwise prepared as in Example 1, was placed in the upper portion of the vessel to be supported therein out of direct contact with the iodine. The glass vessel was then evacuated at 0.1 to 0.01 mm. Hg, sealed at its uppe rend, and placed in an electric furnace at a temperature of 150° C. for a period of 5 hours. The vessel was then removed from the electric furnace and the specimen removed from the vessel. A dispersion treatment comprising heating the specimen in an oven at 200° C. for 3 hours and cooling the same in the oven was carried out. The cast iron specimen was then sliced in the same manner as was done for the specimens of FIGS. 1-20 and a microphotograph cross-sectional view as shown in FIG. 21 was taken. FIG. 21 reveals that an excellent iodized layer can be obtained by immersing the specimen in a gaseous atmosphere containing iodine as well as in a solution containing iodine.

EXAMPLE 6

Cast iron specimens as in Embodiment 1 were prepared and respectively immersed in various solutions at room temperature. The solutions are listed in Table 5, and were prepared by saturating iodine into ethyl alcohol, saturating sodium iodide into ethyl alcohol, further saturating iodine into the sodium iodide ethyl alcohol solution, saturating iodine into methyl alcohol, saturating sodium iodide into methyl alcohol, further saturating iodine into the sodium iodide methyl alcohol solution, and saturating potassium iodide into water. After various periods of immersion as listed in Table 5, the specimens were removed from the solutions and either subjected, or not subjected to a dispersion treatment as set forth in the table. Then the specimens were tested for seizure by using a Falex Wear Tester with pressing power of 15 kg., and at 485 r.p.m.; cast iron specimens not immersed in an iodine solution were also tested and the results compared with those of the treated specimens in Table 5 below:

Table V

| Solution | Immersion time (hrs.) | Dispersion treatment | Time to seizure in minutes | Remarks |
|---|---|---|---|---|
| None treated | None | None | 1-1.5 | Untreated specimens. |
| $C_2H_5OH + I_2$ | 15.5 | | 68 | |
| Same as above | 15.5 | | 76 | |
| Do | 15.5 | 150°×3 hr. (FC) | 123 | |
| Do | 15.5 | Same as above | 120 | |
| Do | 15.5 | 450°×3 hr. (FC) | 255 | |
| Do | 15.5 | Same as above | 230 | |
| $(C_2H_5OH + NaI)$ | 24 | do | 2.5 | |
| Same as above | 24 | do | 2.9 | |
| $(C_2H_5OH + NaI) + I_2$ | 24 | do | 135 | |
| Same as above | 24 | do | 145 | |
| $CH_3OH + I_2$ | 24 | do | 58 | |
| Same as above | 24 | do | 70 | |
| $CH_3OH + NaI$ | 24 | do | 7 | |
| Same as above | 24 | do | 8 | |
| $(CH_3OH + NaI) + I_2$ | 24 | do | 20 | |
| Same as above | 24 | do | 24 | |
| $H_2O + KI$ | 24 | do | 11 | |
| Same as above | 24 | do | 10 | |
| $(H_2O + KI) + I_2$ | 24 | do | 120 | Unseized. |
| Same as above | 24 | do | 120 | Do. |

It is apparent from Table 5, that ferrous materials treated in accordance with the present invention yield a resistance to seizure about 2 to 150 times greater than that of a specimen not subjected to the invention surface treatment. Further, that when the iodizing treatment includes a dispersion treatment after iodizing, the resulting resistance to seizure is more than tripled. From Table 5, the results clearly indicate that when the ferrous material is treated in a saturated iodide-iodine solution, the resistance to seizure is increased by a factor from about 3 to 50.

This might be compared to results obtained with conventional sulphurizing wherein the same material is immersed in a molten salt bath comprising NaCN,

at 570° C. to form an iron sulphide on the surface of the material. Using the same Falex Wear Tester under the same conditions, time to seizure for two cast iron samples was determined to be 31 and 40 minutes. It should, therefore, be apparent the iodizing treatment of the present invention is superior to that of the sulphurizing by as much as a factor of 6.

Although certain specific embodiments of the invention have been shown and described, it is obvious that many modifications thereof are possible. The invention, there-

What is claimed is:

1. The method of treating a ferrous material to yield a surface layer resistant to seizure, comprising: (1) immersing the ferrous material in a solution consisting essentially of an iodic material and a solvent at room temperature for a period of from 10 to 50 hours; said solvent being selected from the group consisting of alcohol, benzene, carbon disulphide, acetone and water; said iodic material being selected from the group consisting of iodine, ammonium iodide, sodium iodide and aluminum iodide when alcohol, benzene, carbon disulphide or acetone is used as said solvent; said iodic material being selected from the group consisting of ammonium iodide, sodium iodide and potassium iodide when water is used as said solvent; said solution being saturated with said iodic material; and (2) heating the treated ferrous material at a temperature ranging from 150° C. to 450° C. for about 3 hours; whereby iodine diffuses in the surface portion of said ferrous material to from a lubricating surface layer containing iodine.

2. The method according to claim 1, wherein said solution comprises a saturated solution of said iodide to which has been added iodine for further saturation.

References Cited

UNITED STATES PATENTS

| | | | |
|---|---|---|---|
| 1,758,293 | 5/1930 | Murray | 148—6.14 X |
| 2,297,909 | 10/1942 | Neely et al. | 148—6.24 |
| 2,491,837 | 12/1949 | Smith-Johannsen | 148—6.14 X |
| 3,184,409 | 5/1965 | Furey | 252—58 X |
| 3,184,413 | 5/1965 | Furey et al. | 252—58 X |
| 3,215,630 | 11/1965 | Compton et al. | 252—18 |

FOREIGN PATENTS

| | | | |
|---|---|---|---|
| 189,278 | 11/1966 | U.S.S.R. | 148—6.14 |

OTHER REFERENCES

Grigorev, Chem. Abstracts, vol. 67, 35863U, 1967.

Hughes et al., Trans. Faraday Soc., vol. 38, 1942, pp. 15, 16.

Iodine, Its Properties and Technical Applications, Chilean Iodine Education Bureau Inc., 1957, p. 69.

RALPH S. KENDALL, Primary Examiner

U.S. Cl. X.R.

252—58; 148—6.35